(12) United States Patent
Larsen

(10) Patent No.: US 11,335,309 B2
(45) Date of Patent: May 17, 2022

(54) CONNECTOR DEVICE FOR ELECTRONIC MUSICAL INSTRUMENTS COMPRISING VIBRATION TRANSDUCER

(71) Applicant: Lars Norman Larsen, Copenhagen (DK)

(72) Inventor: Lars Norman Larsen, Copenhagen (DK)

( * ) Notice: Subject to any disclaimer, the term of this patent is extended or adjusted under 35 U.S.C. 154(b) by 361 days.

(21) Appl. No.: 16/579,369

(22) Filed: Sep. 23, 2019

(65) Prior Publication Data

US 2020/0105235 A1    Apr. 2, 2020

Related U.S. Application Data

(63) Continuation of application No. PCT/DK2018/000008, filed on Mar. 23, 2018.

(30) Foreign Application Priority Data

Mar. 24, 2017   (DK) .............................. PA201700205

(51) Int. Cl.
   *G10H 3/14*     (2006.01)
   *G10D 3/00*     (2020.01)
   *G10F 1/16*     (2006.01)

(52) U.S. Cl.
   CPC .................. *G10H 3/14* (2013.01); *G10D 3/00* (2013.01); *G10F 1/16* (2013.01)

(58) Field of Classification Search
   CPC ............... G10H 3/14; G10D 3/00; G10F 1/16
   (Continued)

(56) References Cited

U.S. PATENT DOCUMENTS

| | | | | |
|---|---|---|---|---|
| 2,430,717 A | * | 11/1947 | Hull ....................... | G10H 3/181 |
| | | | | 84/723 |
| 3,935,782 A | * | 2/1976 | O'Brien ................... | G10H 3/18 |
| | | | | 984/367 |

(Continued)

FOREIGN PATENT DOCUMENTS

| | | | | |
|---|---|---|---|---|
| GB | 2183076 A | * | 5/1987 | ........... G10D 13/003 |
| JP | 2006085109 A | * | 3/2006 | |
| JP | 2006251788 A | * | 9/2006 | |

*Primary Examiner* — Christina M Schreiber
(74) *Attorney, Agent, or Firm* — Yee & Associates, P.C.

(57) ABSTRACT

A connector device for electronic musical instruments. The connector device comprising input electrical connector means that receives electrical signals generated by pickup means for an instrument. The instrument being played and a vibration transducer mechanically attached to the input electrical connector means or provided as an integral part of the input electrical connector means, such that vibrations from the instrument are transferred to the vibration transducer. The vibration transducer generates an electrical output signal based on the vibrations. The connector device comprises electrical output connector means that receives the electrical signals generated by the pickup means and the electrical output signal from the vibration transducer and provides these signals to equipment. The connector device further comprises a mixer that combines the signals $v_g(t)$ from the pickup means and the signal $v_{vib}(t)$ from the vibration transducer. The mixer provides output signal $v_o(t)$ that is a weighted combination of the input signals.

20 Claims, 8 Drawing Sheets

(58) Field of Classification Search
USPC .......................................................... 84/723
See application file for complete search history.

(56) References Cited

U.S. PATENT DOCUMENTS

| | | | | |
|---|---|---|---|---|
| 4,351,217 | A * | 9/1982 | Wechter | G10D 1/08 984/106 |
| 4,519,287 | A * | 5/1985 | Naruse | H01R 24/58 200/51 R |
| 4,569,077 | A * | 2/1986 | Marinelli | G10K 11/004 84/DIG. 24 |
| 4,647,135 | A * | 3/1987 | Reinhardt | H01R 24/58 439/669 |
| 5,010,803 | A * | 4/1991 | Donnell | G10H 3/14 84/723 |
| 5,025,704 | A * | 6/1991 | Davis | G10H 1/0083 84/723 |
| 5,194,686 | A * | 3/1993 | Winkler | G10H 3/146 84/743 |
| 5,614,688 | A * | 3/1997 | Donnell | G10H 3/181 84/743 |
| 6,653,543 | B2 * | 11/2003 | Kulas | G10G 7/02 84/454 |
| 7,015,390 | B1 * | 3/2006 | Rogers | G10H 1/32 84/723 |
| 7,351,905 | B2 * | 4/2008 | Ioffe | G10H 1/32 84/723 |
| 7,818,078 | B2 * | 10/2010 | Iriarte | G10H 1/0083 700/94 |
| 8,183,455 | B2 * | 5/2012 | Armstrong | G10H 1/32 84/740 |
| D678,395 | S * | 3/2013 | Strauser | D17/21 |
| 8,586,850 | B1 * | 11/2013 | Turner | G10H 3/143 84/743 |
| 8,692,102 | B2 * | 4/2014 | Kondo | G10H 3/186 84/723 |
| 9,093,057 | B2 * | 7/2015 | Mejia | G10H 1/02 |
| 9,240,170 | B2 * | 1/2016 | Chekardzhikov | G10D 3/14 |
| 9,691,363 | B2 * | 6/2017 | McHugh | G10D 1/08 |
| 9,699,578 | B2 * | 7/2017 | Crawford | G10H 3/186 |
| 10,096,309 | B2 * | 10/2018 | Suitor | G10D 13/26 |
| 2001/0035084 | A1 * | 11/2001 | Kulas | G10G 7/02 84/290 |
| 2003/0169377 | A1 * | 9/2003 | Kulas | G10G 7/02 349/1 |
| 2005/0087062 | A1 * | 4/2005 | Kiyohiko | G10H 3/146 84/723 |
| 2006/0011049 | A1 * | 1/2006 | Takabayashi | G10H 3/185 84/734 |
| 2007/0234880 | A1 * | 10/2007 | Adams | G10H 1/0066 84/743 |
| 2010/0087937 | A1 * | 4/2010 | Tolson | G10H 3/188 700/94 |
| 2020/0105235 | A1 * | 4/2020 | Larsen | G10D 3/00 |

* cited by examiner

(54) CONNECTOR DEVICE FOR ELECTRONIC
MUSICAL INSTRUMENTS COMPRISING
VIBRATION TRANSDUCER

RELATED APPLICATION

This application is related to and claims the benefit of priority of International Application No. PCT/DK2018/000008, entitled, "Connector Device for Electronic Musical Instruments Comprising Vibration Transducer", filed on Mar. 23, 2018, which is hereby incorporated by reference.

1. TECHNICAL FIELD

The present invention relates generally to the field of electronic musical instruments, such as electric guitars, and more particularly to means for picking up the sound and/or vibrations produced by such instruments when played on, with the aim of amplifying the sound and/or vibrations produced by the instrument and still more particularly for changing the timber of the sound of the instrument before subsequent amplification and provision to loudspeakers.

2. BACKGROUND OF THE INVENTION

One type of electronic musical instruments basically comprises a solid body portion for instance made of wood, over an outer surface portion of which there extend one or more tensioned strings. The strings are connected at respective opposite ends of the strings to the body portion. Attached to the body portion there may be provided a neck portion having a headstock at the end of the neck that faces away from the body portion. The strings are attached to the body portion and/or headstock by suitable means, such that the strings extend above the surface of the body portion and neck, whereby the strings are free to vibrate relative to the body portion and neck, when struck by a player. The player can shorten the vibrating portion of one or more strings by pressing the string(s) towards and into contact with the outer surface of the body portion or neck.

An example of an electronic instrument of the above-mentioned type is the electric guitar. In a typical electric guitar, the strings are made of steel and the body portion and neck are made of wood. The body portion is in many electric guitars a solid block of wood, and in this case the vibrations of the strings that are transmitted to the body portion will only make the body portion vibrate to a very limited extend, resulting in that only very limited sound energy is actually radiated from the body portion and into the surrounding aid. Consequently, amplification of the sound generated by the instrument is required.

Amplification is typically provided by placing one or more electromagnetic pickups under each respective string configured such that when the string vibrates above the pickup, an electrical current is generated in the pickup. This current or the corresponding electrical voltage is provided to an electronic amplifier that provides an amplified electrical signal that corresponds to the vibration of the string to one or more loudspeakers.

The timbre of the amplified sound provided by the instrument can be varied electronically. Thus, typically, a controlled amount of non-linear distortion is added to the signal provided by the instrument in order to enrich the timbre of the sound. Also, vibration can be added to the sound, typically by varying the tension of the strings for instance by the player operating a lever provided on the instrument. It would, however, be desirable to provide new means for varying and even improving the sound obtained from the instrument. Such means should also preferably make it possible to emphasize the musical rhythm by generating amplified rhythmic sounds for example by drumming or tapping on the body portion of the instrument.

DISCLOSURE OF THE INVENTION

On the above background it is an object of the present invention to provide a new means for modifying the timbre of sound created by a musical instrument of the type described above.

It is a further object of the present invention to make it possible for the player of the instrument to emphasize the musical rhythm by means of the instrument itself.

The above and further objects and advantages are according to a first aspect of the present invention provided by a connector device for electronic musical instruments, such as an electric guitar, where the connector device comprises: input electrical connector means, configured to receive electrical signals generated by pickup means provided in or on the instrument, when the instrument is being played by a player; a vibration transducer configured to be mechanically attached to the input electrical connector means or being provided as an integral part of the input electrical connector means, such that vibrations from the instrument are transferred to the vibration transducer, whereby the vibration transducer generates an electrical output signal based on the vibrations of the instrument; and one or more output electrical connector means, configured to receive the electrical signals generated by the pickup means and the electrical output signal from the vibration transducer or mixed or processed versions hereof and to provide these signals to suitable equipment, such as mixers and/or amplifiers.

In an embodiment of the first aspect, the output electrical connector means are electrical lines, which at one end receives the electrical signals generated by the pickup means and the electrical output signal from the vibration transducer and at the other end of the electrical lines being provided with connectors configured to be electrically connected to appropriate input terminals of the above-mentioned mixers and/or amplifiers.

In an embodiment of the first aspect, the output electrical connector means is a wireless communication device that is configured to transmit the output signals from the pickup means and from the vibration transducer to one or more receivers that in turn provides these signals to the appropriate input terminals of the above-mentioned mixers and/or amplifiers.

In an embodiment of the first aspect, mixing of the signals from the pickup means and the vibration transducer, i.e. the mixing ratio between these signals, is controlled manually.

In an embodiment of the first aspect, the connector device can be provided with a user-accessible locking function, such that once a suitable balancing between the output signals from the vibration transducers and the magnitude of the total balanced signal are chosen and the balance between the total balanced signal and the signal provided by the pickup means ids also chosen, the connector device locks the corresponding settings of the first, second and third control means, that controls these balances, such that the relative adjustment of the magnitude of the signals provided by the pickup means and the vibration transducers is maintained, when the magnitude of the total signal outputted to subsequent mixers, amplifiers etc. is changed from a volume control on the instrument, for instance the volume control on an electric guitar. By this locking function, the significant advantage is obtained that it is not necessary to adjust the balancing means when the overall sound volume is changed by a musician during a live performance.

In an embodiment of the first aspect, there is provided means for automatically adjusting the output signal provided by the vibration transducer based on the output signal provided by the pickup means.

In an embodiment of the first aspect, processing comprises pre-amplification of either the vibration transducer output signal or the output signal from the pickup means or a combination hereof.

The output signals from the amplifiers can then be provided to one or more loudspeakers that radiate sound that results from a combination of the signals from the pickup means and the signal from the vibration transducer.

In an embodiment of the first aspect, the vibration transducer is either provided on an outer surface portion of said input electrical connector means or integrated in said input electrical connector means.

In an embodiment of the first aspect, the vibration transducer is a piezoelectric transducer.

In an embodiment of the first aspect, the vibration transduce is an accelerometer.

In an embodiment of the first aspect, the connector device comprises a volume control configured such that a user can vary the level of the electrical signal provided by the vibration transducer before it is provided to the above mentioned suitable equipment, such as mixers and/or amplifiers.

In an embodiment of the first aspect, the connector device comprises a vibration transducer preamplifier, optionally with a user-operable volume control. The preamplifier can be an integrated part of the vibration transducer itself or it can be provided in the input electrical connector means.

In an embodiment of the first aspect, the signals generated by the pickup means, or processed versions of these signals, are provided to said equipment via a signal terminal of a first output electrical connector means, such as a jack connector, and the signals generated by the vibration transducer, or processed versions of these signals, are provided to the equipment via a signal terminal of a second output electrical connector means.

In an embodiment of the first aspect, the signals generated by the pickup means, or processed versions of these signals, are provided to said equipment via a first signal terminal of a third output electrical connector means comprising two signal terminals, and wherein the signals generated by the vibration transducer, or processed versions of these signals, are provided to the equipment via a second signal terminal of the third output electrical connector means.

In an embodiment of the first aspect, the input electrical connector means is a jack connector.

In an embodiment of the first aspect, the first, second and third output electrical connector means are jack connectors.

In an embodiment of the first aspect, the second and third output jack connectors are combined to a stereo jack connector.

In an embodiment of the first aspect, the electrical power output of the vibration transducer is used to supply a preamplifier with electrical power after suitable rectification of the electrical signal from the vibration transducer. According to this embodiment, the preamplifier can be used to amplify the signal provided from the pickup means in the instrument for instance in situations where the output signal from the vibration transducer is not provided to the mixer or amplifier.

In an embodiment of the first aspect, the signal vg(t) from the pickup means and the signal vvib(t) from the vibration transducer are combined in a mixer configured to provide an output signal vo(t) that is a combination of these input signals or processed versions hereof.

In an embodiment of the first aspect, the mixer comprises two input terminals configured to receive respective input signals $v1(t)$ and $v2(t)$ and an output signal configured to provide an output signal vo(t), where the output signal vo(t) is given by the following expression:

$$vo(t)=k\cdot[a\cdot v1(t)+(1-a)\cdot L(v1(t))\cdot v2(t)]$$

where $v1(t)$ is a function of vg(t) and $v2(t)$ is a function of vvib(t); k characterizes the setting of a volume control provided in the musical instruments is a mixing ratio between zero and unity; and $L(v1(t))$ is the level of $v1(t)$.

In an embodiment of the first aspect, the mixer comprises two input terminals configured to receive respective input signals $v1(t)$ and $v2(t)$ and an output signal configured to provide an output signal vo(t), where the output signal vo(t) is given by the following expression:

$$vo(t)=k\cdot[a\cdot v1(t)+(1-a)\cdot v2(t)]$$

where $v1(t)$ is a function of vg(t) and $v2(t)$ is a function of vvib(t); k characterizes the setting of a volume control provided in said musical instrument; and a is a mixing ratio between zero and unity.

In an embodiment of the first aspect, the connector device comprises a male jack connector configured to connect to a corresponding output connector provided in said musical instrument, thereby receiving an output signal vg(t) from pickup means provided in the musical instrument, or from a volume control in the musical instrument that provides a volume controlled version of said output signal vg(t), in or on which male connector there is provided a vibration transducer providing an output signal vvib(t) in response to vibrations of the transducer and means configured to combine said output signals vg(t) and vvib(t), or processed versions of one or both of these signals and to provide an output signal vo(t) based on said output signals vg(t) and vvib(t), or processed versions hereof, where the connector device comprises an output connector configured to provide the output signal vo(t) to a corresponding connector on electrical connection means that can electrically connect the connector device to external equipment, such as a power amplifier.

In an embodiment of the first aspect, the connector device comprises ratio determining means configured to determine the ratio between two input signals va(t)=vg(t) and vb(t)=k·vg(t), where k·vg(t) is the voltage controlled output signal from pickup means provided in the musical instrument, where the ratio determining means determines the ratio |vb(t)/va(t)|=k, which ratio k, or a quantity related hereto, is provided to a controlled amplifier as a control signal, such that the gain G of the controlled amplifier is equal to k or proportional to k, where the controlled amplifier as an input signal receives the output signal vvib(t) from the vibration transducer and where the controlled amplifier thereby provides an output signal vG(t) given by the expression:

$$vG(t)=L(k\cdot vg(t))vvib(t)=k\cdot L(vg(t))vvib(t)$$

where the connector device further comprises a mixer that is configured to receive said volume-controlled output signal k·vg(t) and said output signal vG(t) from the controlled amplifier as input signals and based hereon provide a connector device output signal vo(t) from the mixer given by the expression:

$$vo(t)=k\cdot[a\cdot vg(t)+(1-a)\cdot L(vg(t))\cdot vvib(t)]$$

In an embodiment of the first aspect, the connector device comprises a ratio determining means that determines the ratio between two input signals va(t)=vg(t) and vb(t)=k·vg(t), which ratio |vb(t)/va(t)| equals k, and where the ratio k is provided to a controlled amplifier as a control signal, such that the gain G of the controlled amplifier (28) is equal to k, whereby the controlled amplifier provides an output signal vG(t)=k·vvib(t), where the connector device further comprises a mixer that is configured to receive the volume controlled output signal k·vg(t) and the output signal vG(t) from the controlled amplifier as input signals and based hereon provide a connector device output signal vo(t) from the mixer given by the expression:

$$vo(t)=k\cdot[a\cdot vg(t)+(1-a)\cdot vvib(t)]$$

In an embodiment of the first aspect, at least one further vibration transducer is provided in vibrational contact with the input electrical connector.

In an embodiment of the first aspect, the at least two vibration transducers are provided in vibrational contact with the input electrical connector means, and the connector device comprises one or more electrical output connector means configured to receive the electrical signals generated by the pickup means and the electrical output signal from the at least two vibration transducers and to provide these signals, or mixed or processed versions hereof, to suitable equipment, such as amplifiers or mixers.

In an embodiment of the first aspect, the vibration transducers have different frequency responses and/or different directional sensitivities relative to the input electrical connector means. This means that the electrical output signals from the different vibration transducers may differ depending on the vibration mode of the input electrical connector means and hence on the vibration mode of the musical instrument to which the input electrical connector means is mechanically connected during use of the invention.

In an embodiment of the first aspect, the at least two vibration transducers provide electrical output signals to a balancing circuit, where the balancing circuit is configured to provide an output signal Vo(t), which is a weighted combination of the output signal vg(t) from the guitar pickup and the output signals from the respective vibration transducers.

In an embodiment of the first aspect, the connector comprises two vibration transducers, and the output signal Vo(t) is a weighted sum of the output signal vvib1(t) from the first vibration transducer and the output signal vvib2(t) from the second vibration transducer and the output signal vg(t) from the guitar pickup:

$$Vo(t)=b1vg(t)+b2vvib1(t)+b3vvib2(t)$$

where b1, b2 and b3 are weight factors.

In an embodiment of the first aspect, the magnitude of the output signal Vo(t) can be controlled from a volume control provided on the guitar and the individual weight factors b2 and b3 or the ration between these weight factors can be controlled from the connector device. Thus, in this embodiment, the output signal Vo(t) is given be the expression:

$$Vo(t)=\text{VOL}g[vg(t)+b2vvib1(t)+b3vvib2(t)]$$

where VOLg indicates the setting of the volume control on the electronic instrument, such as an electric guitar.

In an embodiment of the first aspect, the magnitude of the output signal Vo(t) can be controlled from a volume control provided on the guitar and the individual weight factors b2 and b3 or the ration between these weight factors can be controlled from the connector device. According to this embodiment, also the total magnitude of the signal provided by the vibration sensors can be controlled from the connector device. Thus, in this embodiment, the output signal Vo(t) is given be the expression:

$$Vo(t)=\text{VOL}g[vg(t)+\text{VOL}vib(b2vvib1(t)+b3vvib2(t))]$$

In an embodiment of the first aspect, the output signal vg(t) from the pickup means is provided via suitable connector means to an amplifier or a mixer separately and either a weighted combination of the two output signals vvib1(t) and vvib2(t) or each of these separately are provided to the amplifier or mixer that receives the signal vg(t) from the guitar pickup.

In an embodiment of the first aspect, the respective output signals from the pickup means and the two or more vibrator transducers are amplified and/or impedance matched if required, before these signals are provided to a mixer or amplifier.

In an embodiment of the first aspect, the output electrical connector means are electrical lines, which at one end receives the electrical signals generated by the pickup means and the electrical output signal from the one or more vibration transducers and at the other end of the electrical lines being provided with connectors configured to be electrically connected to appropriate input terminals of the above-mentioned mixers and/or amplifiers.

In an embodiment of the first aspect, the output electrical connector means is a wireless communication device that is configured to transmit the output signals from the pickup means and from the one or more vibration transducers to one or more receivers that in turn provides these signals to the appropriate input terminals of the above-mentioned mixers and/or amplifiers.

The above and further objects and advantages are according to a second aspect of the present invention provided by a method for modifying the timbre of the sound emitted from one or more loudspeakers and generated by a musical instrument that comprises one or more strings and pickup means configured to pick up vibrations of the strings and convert these vibrations to first electrical signals, where the method comprises providing a vibration transducer in vibration contact with the housing of the musical instrument, such that the vibration transducer generates a second electrical signal corresponding to the vibrations of the housing, and mixing said first and second signals, or processed versions hereof, thereby providing a combined output signal based on the signals from said pickup means and said vibration transducer to suitable power amplifier means configured to drive said loudspeakers.

The above and further objects and advantages are according to a third aspect of the present invention provided by connector system for electronic instruments, such as an electric guitar, the system comprising: a connector configured to receive the output signal from a pickup means in the instrument, or a processed/volume adjusted version hereof; one or more vibration transducers configured to be in vibrational connection with one or more portions of the instrument, which portions vibrate, when the instrument is played upon; and a combination device configured to receive the output signals from said pickup means, or a processed/volume adjusted version hereof, and the output signals, or a processed/volume adjusted version hereof, of said one or more vibration transducers and to provide a blended output signal based on said signals from the pickup means and the vibration transducers, or a processed/volume adjusted version hereof, and provide this blended output signal to subsequent equipment, such as effect pedals, mixers and/or amplifiers.

In an embodiment of the third aspect, the vibrational connection is established by means of a wire, cord, cable or other suitable electrical line between the connector and the one or more vibration transducers.

In an embodiment of the third aspect, the vibrational connection is established directly between the respective vibration transducer and the vibrating portion of the instrument.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein.

DETAILED DESCRIPTION OF THE INVENTION

The principles of the invention will be illustrated by two embodiments hereof. It is however understood that a person skilled in the art may conceive other embodiments than those actually shown and described in the detailed description of the invention and that the scope of the invention is defined by the independent claims.

Figures 1A, 1B, 1C:
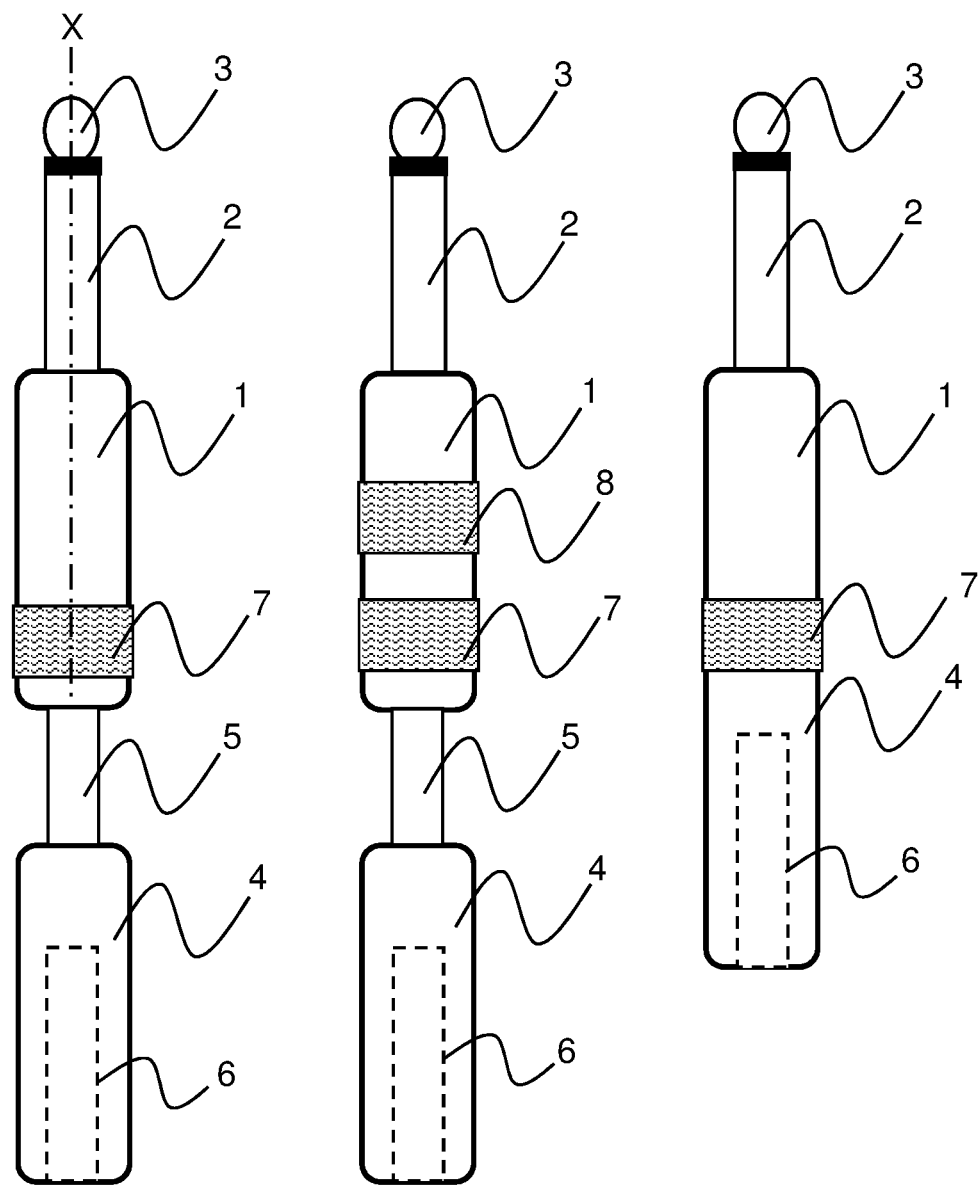
FIGS. 1A-1C show a schematic view of different embodiments of a connector device according to the invention wherein a mono male jack connector is configured to receive the guitar pickup signal from an electric guitar and a mono female jack connector is configured to provide a processed signal to a connecting line to an amplifier.

With reference to FIGS. 1(a), (b) and (c) there are shown a schematic view of different embodiments of a connector device according to the invention wherein a mono male jack connector is configured to receive the guitar pickup signal from an electric guitar and a mono female jack connector is configured to provide a processed signal to a connecting line to an amplifier.

The embodiment shown in FIG. 1(a) comprises a mono male jack connector 1 comprising a ground terminal 2 and a signal terminal 3. The mono male jack connector 1 is in electrical connection via an appropriate line 5 with a mono female jack connector 4, 6. Integrated in the housing of the male connector 1 there is provide a user operable balance adjustment member 7 that for instance comprises a tubular member that can be rotated about the longitudinal axis x of the connector 1. By rotating this member 7, the operator can adjust the balance between the signal provided by the pickup or pickups in the instrument, for instance an electric guitar as explained with reference to FIGS. 3 and 4.

The embodiment shown in FIG. 1(b) corresponds basically to the one shown in FIG. 1(a) except for the provision of a tone control 8 configured to alter the timbre of the sound produced based on the output signal from the vibration transducer.

In the embodiment shown in FIG. 1(c), the separate male and female jack connectors 1 and 4, respectively, have been integrated to a single jack connector with the male portion at one longitudinal end and the female portion at the opposite longitudinal end.

Figure 2:
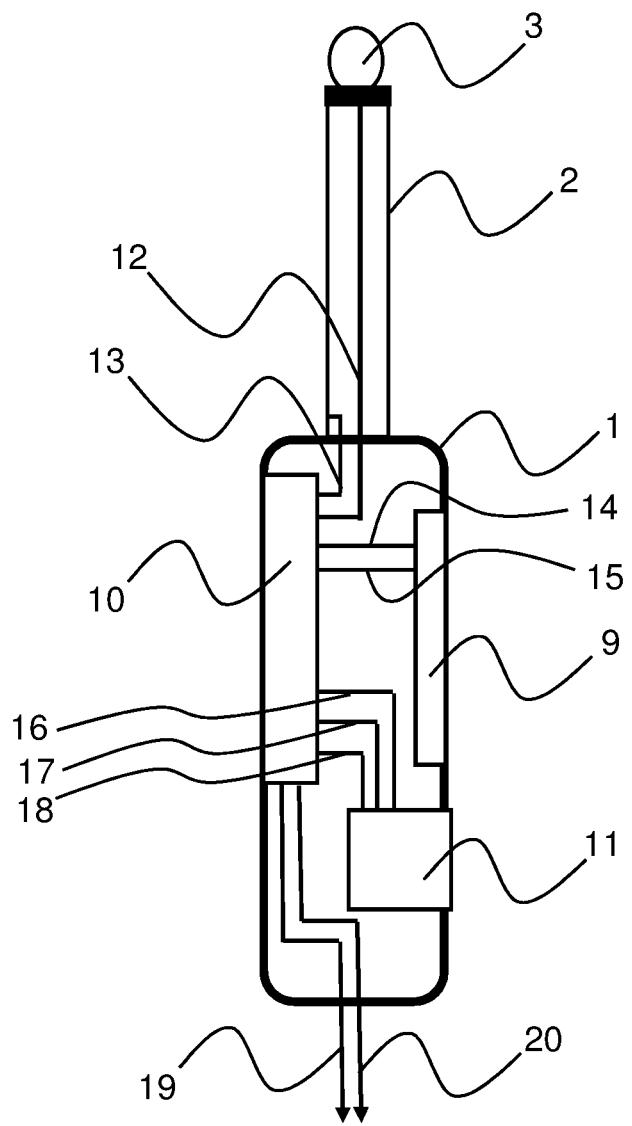
FIG. 2 shows a schematic cross-sectional view of a male jack connector according to an embodiment of the invention showing the main functional blocks of the connector.

With reference to FIG. 2 there is shown a schematic cross-sectional view of a male jack connector 1 according to an embodiment of the invention showing the main functional blocks of the connector.

Figure 3:
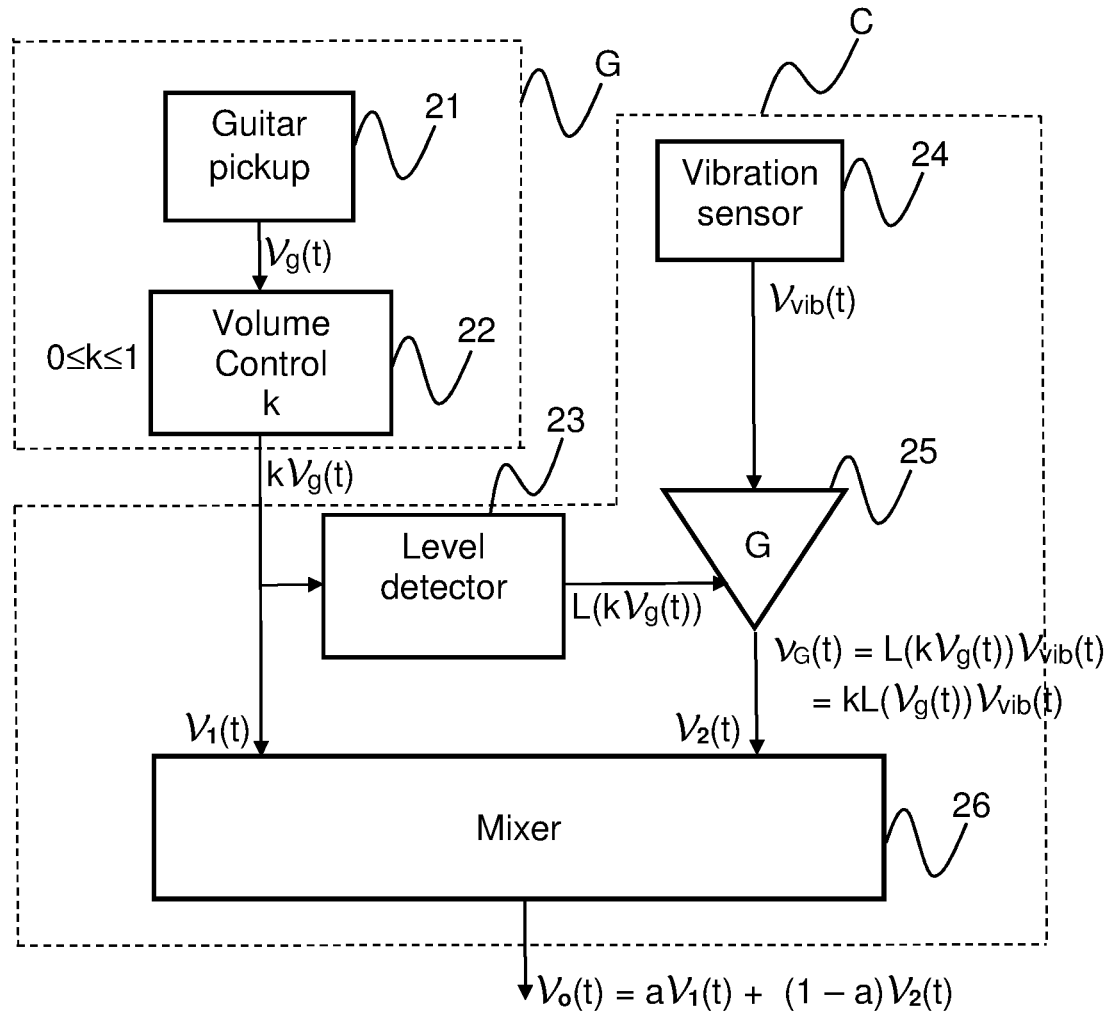
FIG. 3 shows a block diagram of an electronic control and balancing circuit according to an embodiment of the invention.
Figure 4:
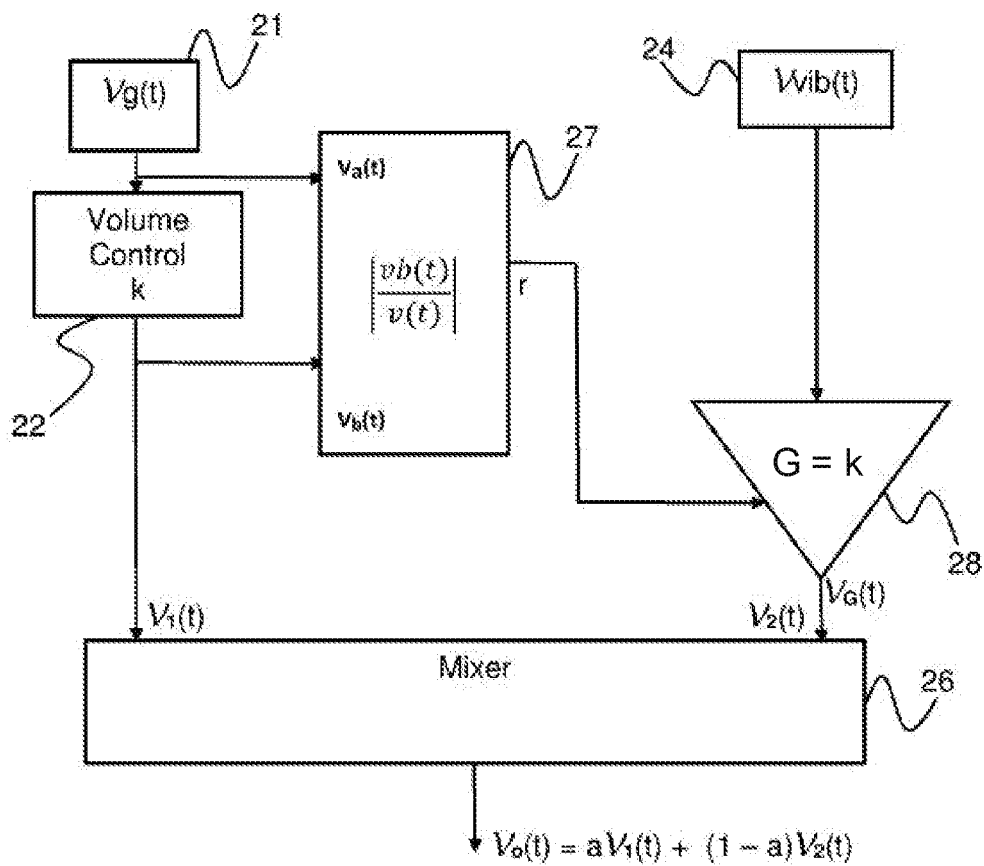
FIG. 4 shows a block diagram of an electronic control and balancing circuit according to an alternative embodiment of the invention.

Inside the housing of the connector 1 there is provided a vibration transducer 9 that in the shown embodiment is mechanically connected to the wall of the connector such that vibrations picked up by the connector 1 are transferred to the vibration transducer 9. It would however also be possible to provide the vibration transducer 9 at other locations in the connector 1, provided the vibration transducer 9 is able to sense the vibrations of the connector 1 caused by vibrations of the musical instrument. In preferred embodiments, the vibration transducer 9 is not in contact with the wall of the connector 1, as a mounting of the vibration transducer 9 directly on a wall portion of the connector 1 tends to produce a noise signal from the vibration transducer 9, when the user for instance touches the connector 1. The vibration transducer 9 is electrically coupled by lines 14 and 15 to a balancing circuit 10 that can be configured for instance as illustrated in FIGS. 3 and 4, respectively. It is however understood that other configurations of balancing circuits than those illustrated in FIGS. 3 and 4 could be used, and that the use of such other circuits would fall within the scope of the present invention as defined by the independent claims. The balancing circuit further receives the signal from the guitar (or other instrument) pickup(s) via line 12. Line 13 is connected to the ground terminal 2 of the male jack connector 1.

A balancing control 11 by means of which a user can adjust the level balance of the signal provided by the pickup(s) and the signal provided by the vibration transducer 9 is provided in the housing of the male jack connector 1, such that the user has access to the balance control from the outside of the housing. The three lines indicated by ref no.

16, 17 and 18 are the lines that connect the balancing circuit 10 with the three terminals of a potentiometer that is used as the balancing control 11.

The output signal (that is to be provided to a suitable power amplifier) is provided on lines 19 and 20 (one of which is the ground line).

With reference to FIG. 3 there is shown a block diagram of an electronic control and balancing circuit according to an embodiment of the invention generally designated by C. An electric guitar G comprises one or more guitar pickups 21 and a volume control 22. The volume control 22 can be varied between a position in which no signal is passed through the volume control (k=0) and a position in which the signal passes through the volume control without attenuation (K=1). The pickup 21 provides an output signal vg(t) for instance when one or more strings of an electric guitar is plucked. The vibrations of the one or more strings are also transferred to the housing of the guitar that consequently vibrates, and these vibrations are transferred to the vibration transducer 24 provided in or on the male jack connector. When vibrating, the vibration transducer 24 generates an output signal vvib(t).

The output voltage k·vg(t) is provided to a mixer 26 and to a level detector 23, which determined the level L(k·vg(t))=k·L(vg(t)) of the output signal from the volume control 22. The level detector 23 provides a control signal equal to (or proportional to) k·L(vg(t)) to a voltage-controlled amplifier 25. In these expressions, k is the quantity describing the setting of the volume control provided in the guitar or other instrument and L(vg(t) is the level of the output voltage from the one or more guitar pickups. In a practical implementation, L is to be determined with a proper time constant, e.g. by averaging the output signal from the pickup(s) over a given time interval.

The vibration transducer 24 provides an output signal vvib(t) to the input of the controlled amplifier 25. The output voltage from the controlled amplifier is hence equal to: k·L(vg(t))·vvib(t) as shown in FIG. 3.

In the control and balancing circuit there is provided a mixer 26 that receives the two input signals v1($t$) and v2($t$) and provide an output signal vo(t) that is a weighted combination of the two input signals. As it appears from FIG. 3, v1($t$)=k·vg(t) and v2($t$)=k·L(vg(t))·vvib(t).

The mixer 26 provides an output signal given by the expression:

$$vo(t)=a \cdot v1(t)+(1-a) \cdot v2(t)$$

With the setup shown in FIG. 3, this results in the following expression for the output signal from the mixer 26:

$$vo(t)=k \cdot [a \cdot vg(t)+(1-a) \cdot L(vg(t)) \cdot vvib(t)]$$

The output voltage vo(t) is provided to a power amplifier (not shown) via the female jack connector 4 shown in FIG. 1 and an appropriate electrical line.

The control and balancing circuit shown in FIG. 3 only requires input signals from the pickup(s) in the guitar and the vibration transducer. Hence, it can be used without any modifications to an existing instrument, for instance an electric guitar. The overall volume (determining the volume of sound radiated from the loudspeakers is—as in the case of a traditional electric guitar—determined directly from the volume control on the guitar. The mixing ratio a can be determined by means of the balance control 7, 11 provided on the jack connector (see FIGS. 1 and 2).

With reference to FIG. 4 there is shown a block diagram of an electronic control and balancing circuit according to an alternative embodiment of the invention. This embodiment requires electrical access to both terminals of the volume control 22 in the electrical instrument.

The input signals to the control and balancing circuit according to the embodiment shown in FIG. 4 are the pickup output signal vg(t) and the vibration sensor output signal vvib(t), respectively. The mixer 26 has a function identical to the mixer in FIG. 3 (hence the same reference numeral 26).

The control and balancing circuit in FIG. 4 comprises a ratio determining means 27 that determines the ratio between the two input signals va(t)=vg(t) and vb(t)=k·vg(t). The ratio determining means 27 determines the ratio |vb(t)/va(t)|=k. The ratio k is provided to a controlled amplifier 28 as a control signal, such that the gain G of the is equal to k. By application of the various mathematical expressions mentioned in relation to the circuit in FIG. 3, the following expression for the output voltage from the mixer 26 can be obtained:

$$vo(t)=k \cdot [a \cdot vg(t)+(1-a) \cdot vvib(t)]$$

The output voltage vo(t) is provided to a power amplifier (not shown) via the female jack connector 4 shown in FIG. 1 and an appropriate electrical line. Hence, by application of the control and balancing circuit shown in FIG. 4, a linear combination of the output signals provided from the pickup(s) and the vibration transducer can be obtained.

Access to the signals on either terminal of the volume control in the instrument may require a small modification of the respective connectors on the instrument and the connector device according to the invention. It would for instance be possible instead of mono jack connectors to apply a female stereo jack connector in the instrument and a corresponding male stereo jack connector in the connector device according to the invention (replacing connector 1 in FIG. 1) and use the extra terminal thus provided in the connectors to provide the output signal vg(t) directly from the pickup(s). Other possibilities also exist which would be easily envisaged by a person skilled in the art.

Figure 5:
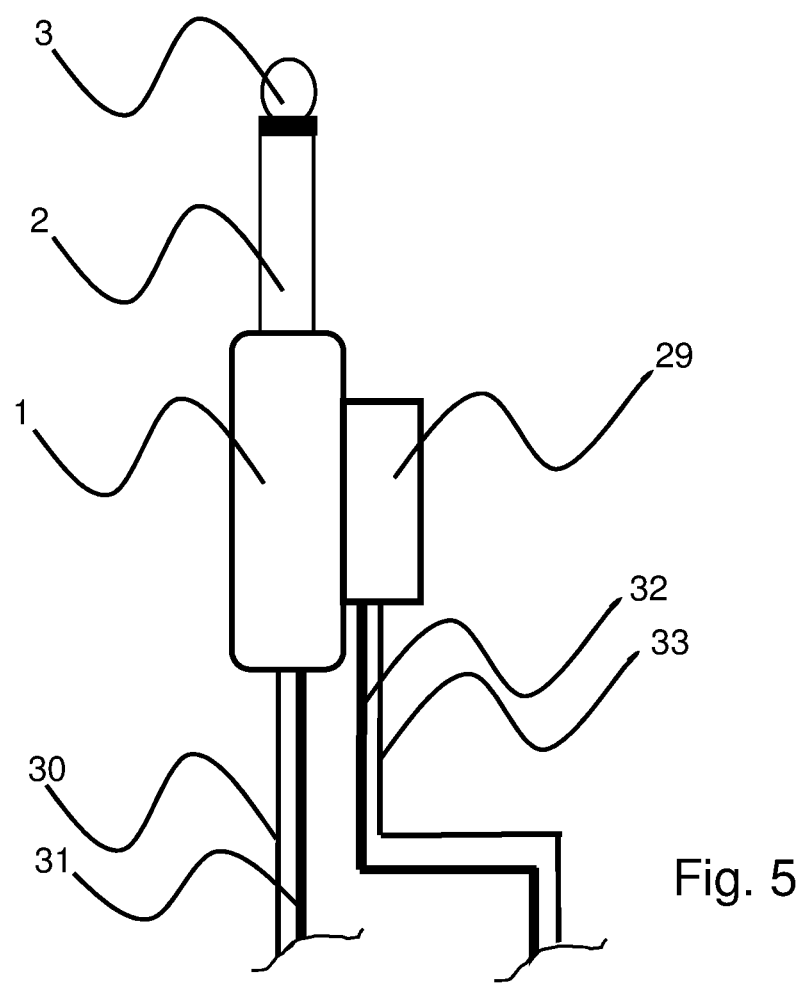
FIG. 5 shows a schematic view of another embodiment of a connector device according to the invention wherein a mono male jack connector is configured to receive the guitar pickup signal from an electric guitar and two mono male jack connectors are configured to provide signals from the guitar pickup and the vibration transducer, respectively, to two separate input terminals of an amplifier.
Figure 5:
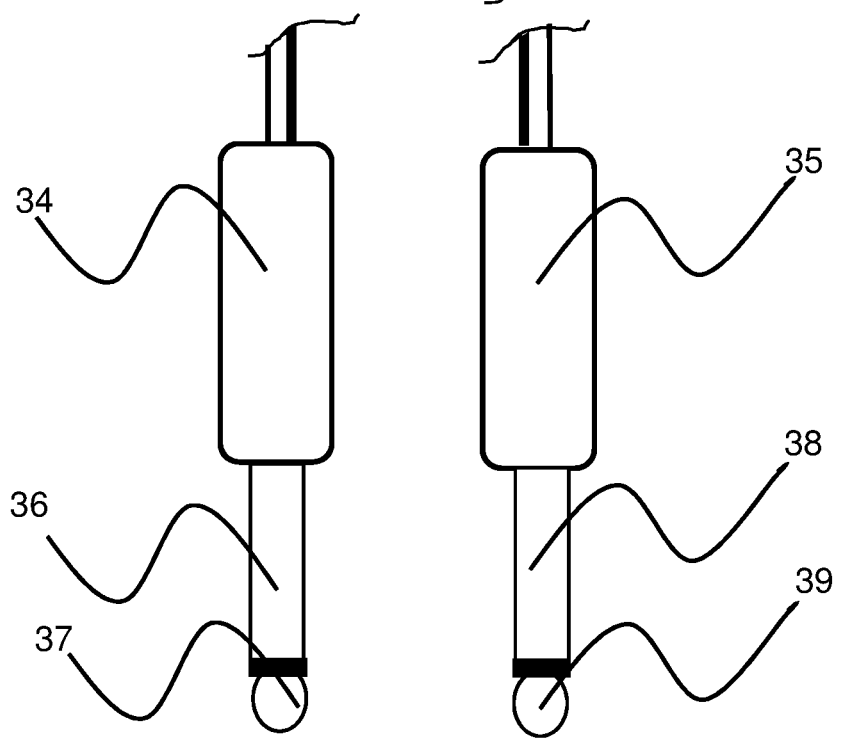

With reference to FIG. 5 there is shown a schematic representation of a first embodiment of the invention.

A first mono jack connector 1 comprising ground and signal terminals 2 and 3, respectively is via electrical lines 30 (signal) and 31 (ground) connected to a second mono jack connector 34. The electrical ground line 31 is connected to the ground terminal 36 of the second mono jack connector 34 and the electrical signal line 30 is connected to the signal terminal 37 of the second mono jack connector 34.

In use, the first mono jack connector 1 is plucked into a corresponding female jack connector provided on the musical instrument as for instance an electric guitar. The signal terminal 3 of the first mono jack connector 1 receives the electrical signal provided for example by one or more traditional string pick-ups in an electric guitar or a similar musical instrument. The electrical signal from the pick-ups is provided to an amplifier or mixer via the second mono jack connector 34.

When the musical instrument is played, the casing or house of the instrument vibrates, and the vibrations are transferred to the first mono jack connector 1 that is mechanically connected to the house or casing of the instrument via the female jack connector provided in the house or casing.

On the outer surface of the first mono jack connector 1 there is in this embodiment provided a vibration transducer 29 that converts the vibrations of the first mono jack connector 1 into a corresponding electrical output signal.

This signal is via line 33 provided to a third mono jack connector 35, i.e. to the signal terminal 39 of the third mono jack connector 35. Hence, two separate electrical signals are provided to the amplifier: (1) the signal picked up by the traditional pick-up arrangement in the instrument, and (2) the signal provided by the vibration transducer 29. These two signals can then be processed in the amplifier and provided to one or more loudspeakers. Line 38 is the ground terminal of the third mono jack connector 35. Line 32 is a ground line and is connected to the ground terminal 38 of the third mono jack connector 35.

Figure 6:
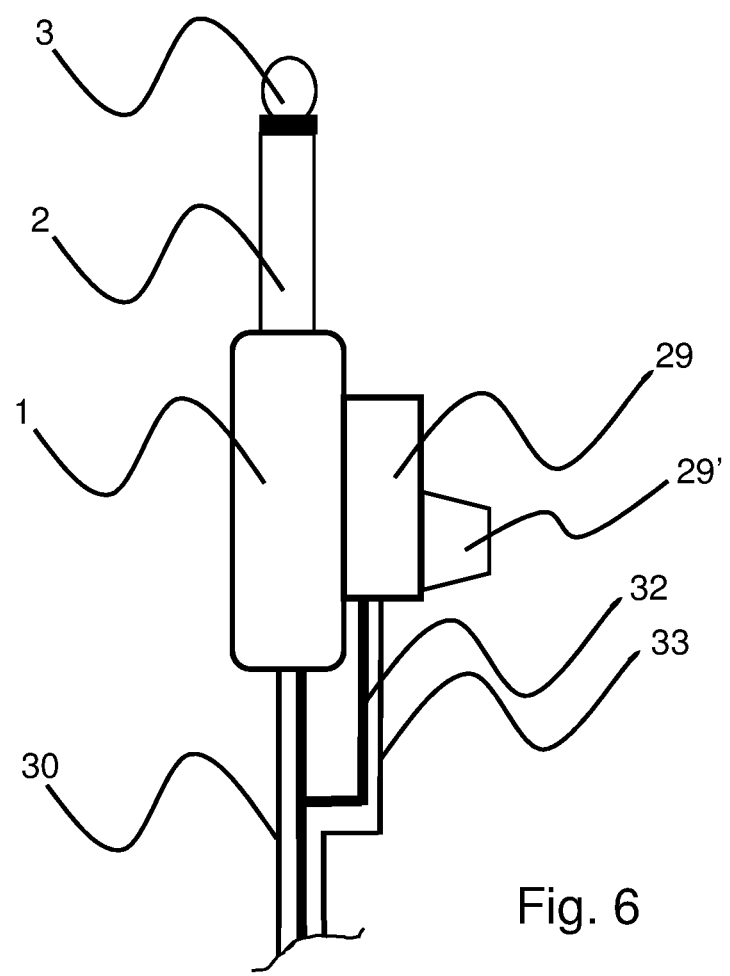
FIG. 6 shows a schematic view of still another embodiment of a connector device according to the invention wherein a mono male jack connector is configured to receive the guitar pickup signal from an electric guitar and a single stereo male jack connector is configured to provide signals from the guitar pickup and the vibration transducer, respectively, to a single input terminal of an amplifier, which terminal is configured to receive two separate input signals.
Figure 6:
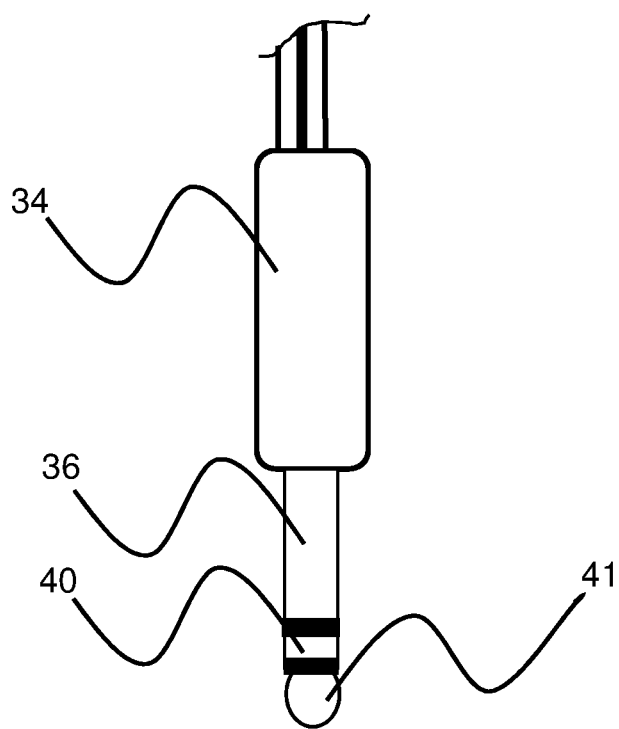

With reference to FIG. 6 there is shown a schematic representation of a second embodiment of the invention.

A mono jack connector 1 comprising ground and signal terminals 2 and 3, respectively is via electrical lines 30 (signal) and 32 (ground) connected to a stereo jack connector 34 comprising a ground terminal 36 and signal terminals 40 and 41. The signal line 30 is either connected electrically to signal terminal 40 or 41 of the stereo jack connector 34.

In use, the mono jack connector 1 is plucked into a corresponding female jack connector provided on the musical instrument as for instance an electric guitar. The signal terminal 3 of the mono jack connector 1 receives the electrical signal provided for example by the traditional string pick-ups in an electric guitar or a similar musical instrument. The electrical signal from the pick-ups is provided to an amplifier via the stereo jack connector 34.

When the musical instrument is played, the casing or house of the instrument vibrates, and the vibrations are transferred to the mono jack connector 1 that is mechanically connected to the house or casing of the instrument via the female jack connector provided in the house or casing.

On the outer surface of the mono jack connector 1 there is in this embodiment provided a vibration transducer 29 that converts the vibrations of the mono jack connector 1 into a corresponding electrical output signal. This signal is via line 33 provided to the stereo jack connector 34, i.e. to the signal terminal 40 or 41 that is not carrying the electrical signal from the pick-up in the instrument. Hence, two separate electrical signals are provided to the amplifier: (1) the signal picked up by the traditional pick-up arrangement in the instrument, and (2) the signal provided by the vibration transducer 29. These two signals can then be mixed or otherwise processed in the mixer or amplifier.

Optionally, a volume control 29' can be provided on the vibration transducer 29 (or in the mono jack connector 1) configured to adjust the magnitude of the signal from the vibrator transducer 29 to the amplifier.

In the embodiment shown in FIG. 6, the vibration transducer 29 is shown attached to the outer surface of the mono jack connector 1.

In another embodiment of the invention, the vibration transducer 29 could be integrated in the mono jack connector 1 itself, dependent on the size and dimensions of the vibration transducer actually used as described in connection with the embodiments shown in FIGS. 1 through 4.

In case the vibration transducer used in the invention requires a supply voltage or current, this can for instance be provided from the amplifier via a suitable supply line (not shown). Alternatively, dependent on the specific vibration transducer used, the supply voltage or current may be provided by a voltage or current supply in the transducer itself or in either of the jack connectors.

In an embodiment of the invention, the electrical power output of the vibration transducer is used to supply a preamplifier with electrical power after suitable rectification of the electrical signal from the vibration transducer.

According to this embodiment, the preamplifier can be used to amplify the signal provided from the pickup means in the instrument for instance in situations where the output signal from the vibration transducer is not provided to the mixer or amplifier. Different types of vibration transducers may be used in the present invention. One such transducer is a piezo electric transducer.

Depending on the specific type of transducer used, it may be necessary to provide a suitable transducer preamplifier in close proximity of the transducer. The transducer preamplifier may serve various purposes, such as converting a very high output impedance of the transducer to a low impedance required (or at least advantageous) for the signal connection to the mixer or amplifier. The output voltage or current actually provided by the transducer itself may also be so low that pre-amplification hereof is needed or at least desired before the signal from the transducer is provided to the mixer or amplifier.

Figure 7:
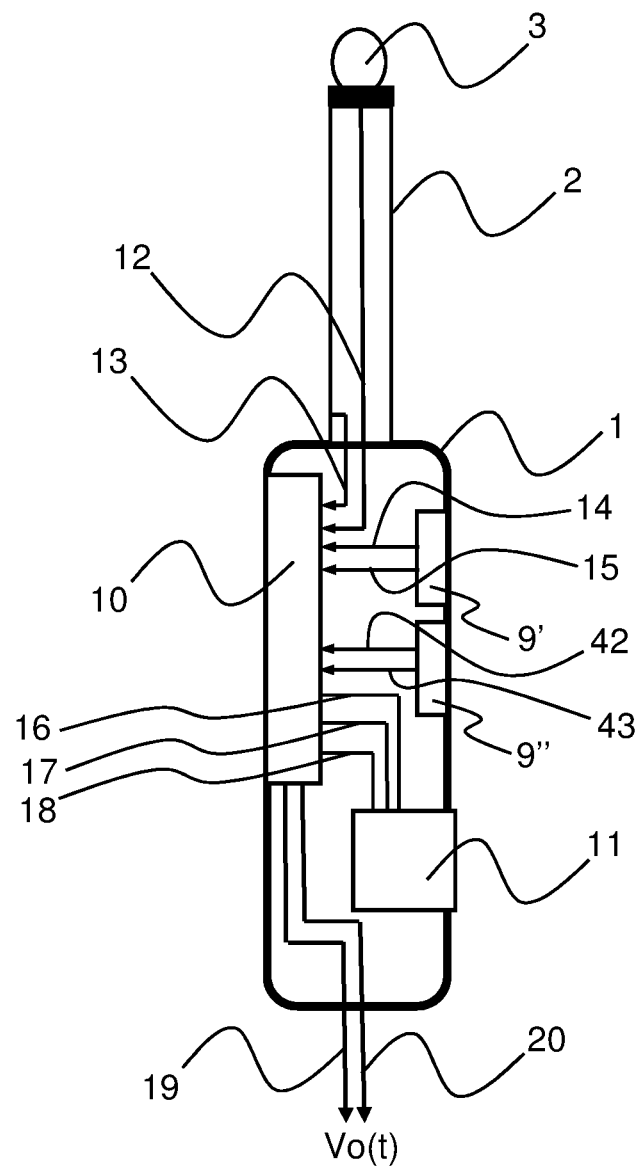
FIG. 7 shows a schematic cross-sectional view of a male jack connector according to a further embodiment of the invention comprising two vibration transducers showing the main functional blocks of the connector.

With reference to FIG. 7 there is shown a schematic cross-sectional view of a male jack connector 1 according to a further embodiment of the invention comprising two vibration transducers 9' and 9". The respective vibration transducers 9' and 9" provides electrical output signals on lines 14, 15 and 42, 43, respectively to the balancing circuit 10 described above with reference to FIG. 2. In the embodiment shown in FIG. 7, the balancing circuit in addition to the output signals from the vibration transducers 9', 9" also receives the output signal from the guitar pickup on lines 12, 13. The balancing circuit is configured to provide an output signal on lines 19 and 20 to for instance an amplifier, which output signal is a weighted combination of the output signal $v_g(t)$ from the guitar pickup, the output signal $v_{vib1}(t)$ from the first vibration transducer 9' and the output signal $v_{vib2}(t)$ from the second vibration transducer 9", i.e. the output signal on lines 19, 20 is given by the expression:

$$Vo(t)=b_1v_g(t)+b_2v_{vib1}(t)+b_3v_{vib2}(t)$$

where b1, b2 and b3 are weight factors. The three lines indicated by ref. no. 16, 17 and 18 are the lines that connect the balancing circuit 10 with the three terminals of a potentiometer that is used as the balancing control 11.

In an alternative embodiment to the one shown in FIG. 7, the output signal vg(t) from the guitar pickup may be provided to an amplifier or a mixer separately and either a weighted combination of the two output signals vvib1($t$) and vvib2($t$) or each of these separately could also be provided to the amplifier or mixer that receives the signal vg(t). It is understood, that the respective output signals from the guitar pickup and the two vibrator transducers may be amplified and/or impedance matched if necessary before being provided to a mixer or amplifier.

An advantage obtained by the application of two (or possibly even more) vibration transducers is that this opens up for the possibility to adapt the invention optimally to different guitars, where the vibration frequency characteristics and vibration pattern on the surface of the guitar, and hence at the location where the output socket is provided on a specific guitar. Thus, according to the invention, two or more vibration transducers with different transfer functions and different directional sensitivities could be used for instance for different guitar designs.

It is understood that the circuits shown in FIGS. 3 and 4 may also be used in those embodiments that comprise two or more vibration transducers. In this case, block 24 in FIGS. 3 and 4 represent such two or more vibration transducers as well as any circuits designed to balance the respective signals from the two or more vibration transducers and/or to control the magnitude of the total output signal from the balanced two or more vibration transducer signals.

Figure 8:
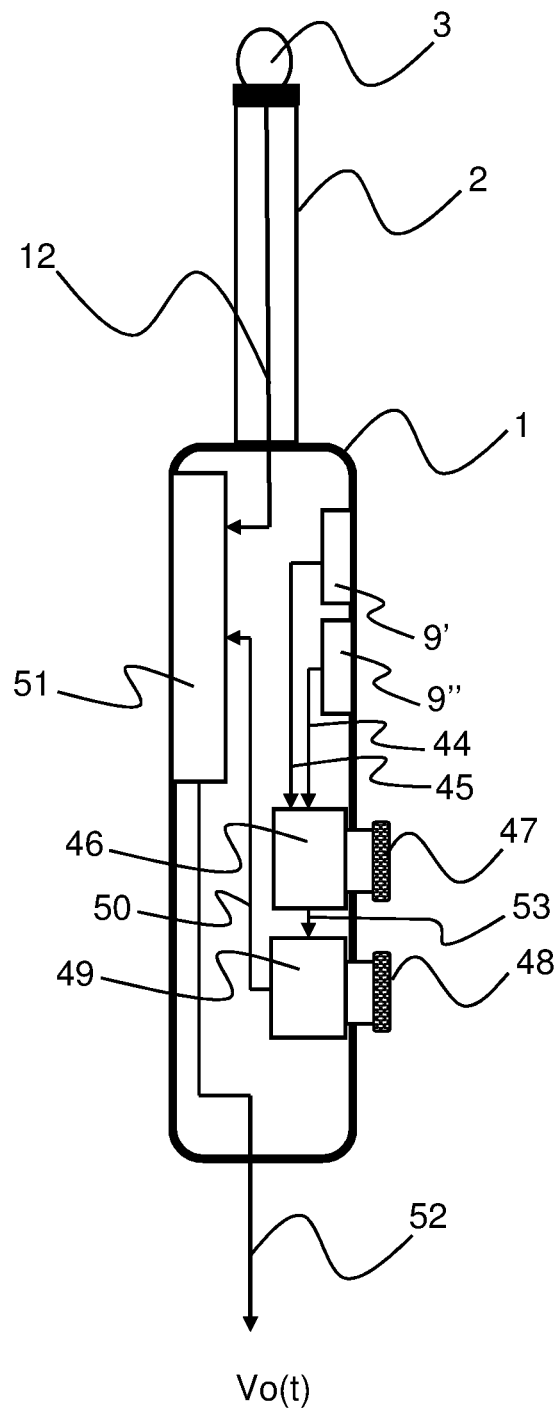
FIG. 8 shows a schematic cross-sectional view of a male jack connector according to a still further embodiment of the invention comprising two vibration transducers and control means configured to control the balance between the magnitudes of the respective output signals from the two vibration transducers and the magnitude of the total signal provided by the two vibration transducers with the chosen balancing of their respective output signals.

FIG. 8 shows a schematic cross-sectional view of a male jack connector (or the "input electrical connector means" as it is termed repeatedly in the description and claims) according to a still further embodiment of the invention comprising two vibration transducers 9' and 9" and first control means 46 configured to control the balance between the respective output signals 44, 45 from the two vibration transducers 9' and 9", respectively. The shown embodiment further comprises a second control means 49 receiving the balanced output signal 53 provided by the first control means 46 by means of which the magnitude of the total signal provided by the two vibration transducers with the chosen balancing of their respective output signals can be controlled. The first and second control means can be operated by a user for instance by turning the control members 47 and 48 that are accessible from outside the connector housing. The second control means 49 provides the output signal 50 to a third control means 51 that also receives the signal 12 from the pickup means in the guitar or other electronic instrument. The third control means 51 determines the balance between the signals 50 derived from the vibration transducers and the signal from the pickup means. To the effect, the third control means 51 can be provided with a user-accessible control member (which is not shown in the figure). In a preferred embodiment, the third control means 51 is configured such that the magnitude of the output signal 52 that is provided to a mixer or amplifier can be controlled directly from the volume control on the electronic instrument, such as an electric guitar. This can for instance be accomplished using the circuits according to the invention that are shown in FIGS. 3 and 4, respectively.

The connector device can be provided with a user-accessible locking function, such that once a suitable balancing between the output signals 44, 45 from the vibration transducers and the magnitude of the total balanced signals (on line 50) are chosen and the balance between the total balanced signal 50 and the signal 12 provided by the pickup means is also chosen, the connector device locks the corresponding settings of the first, second and third control means 46, 49, 51, such that these settings remain unchanged until the locking function is released, after which a user may readjust the settings. The proper balancing can thus be found for instance prior to a live performance and locked, such that they are not unintentionally changed during the performance.

One or more features of the illustrative examples are described in the following clauses. These clauses are examples of features not intended to limit other illustrative examples.

Clause 1. A connector device for electronic musical instruments, such as electric guitars, the connector device comprising:

input electrical connector means configured to receive electrical signals generated by pickup means provided in or on the instrument, when the instrument is being played by a player;

a vibration transducer configured to be mechanically attached to the input electrical connector means or being provided as an integral part of the input electrical connector means, such that vibrations from the instrument are transferred to the vibration transducer, whereby the vibration transducer generates an electrical output signal based on the vibrations of the instrument;

one or more electrical output connector means configured to receive said electrical signal generated by the pickup means and said electrical output signal from the vibration transducer, or mixed or processed versions hereof, and to provide these signals, to suitable equipment, such as amplifiers or mixers.

Clause 2. A connector device according to clause 1, wherein said signal vg(t) from the pickup means and the signal vvib(t) from the vibration transducer or processed versions of these signals are combined in a mixer or balancing circuit configured to provide an output signal vo(t) that is a combination of said signals from the pickup means and the vibration transducer or processed versions of these signals.

Clause 3. A connector device according to clause 2, wherein said mixer comprises two input terminals configured to receive respective input signals v1(t) and v2(t) and an output signal configured to provide an output signal vo(t), where said output signal vo(t) is given by the following expression:

$$vo(t)=k \cdot [a \cdot v1(t)+(1-a) \cdot L(v1(t)) \cdot v2(t)]$$

where v1(t) is a function of vg(t) and v2(t) is a function of vvib(t); k characterizes the setting of a volume control provided in said musical instrument; a is a mixing ratio between zero and unity; and L(v1(t)) is the level of v1(t).

Clause 4. A connector device according to clause 2, wherein said mixer comprises two input terminals configured to receive respective input signals v1(t) and v2(t) and an output signal configured to provide an output signal vo(t), where said output signal vo(t) is given by the following expression:

$$vo(t)=k \cdot [a \cdot v1(t)+(1-a) \cdot v2(t)]$$

where v1(t) is a function of vg(t) and v2(t) is a function of vvib(t); k characterizes the setting of a volume control provided in said musical instrument; and a is a mixing ratio between zero and unity.

Clause 5. A connector device according to clause 1, wherein said vibration transducer is either provided on an outer surface portion of said input electrical connector means or integrated in said input electrical connector means.

Clause 6. A connector device according to clause 1 or 2, wherein said vibration transducer is a piezoelectric transducer.

Clause 7. A connector device according to any of the preceding clauses, wherein the connector device comprises a male jack connector configured to connect to a corresponding output connector provided in said musical instrument, thereby receiving an output signal vg(t) from pickup means provided in the musical instrument, or from a volume control in the musical instrument that provides a volume controlled version of said output signal vg(t), in or on which male connector there is provided a vibration transducer providing an output signal vvib(t) in response to vibrations of the transducer and means configured to combine said output signals vg(t) and vvib(t), or processed versions of one or both of these signals and to provide an output signal vo(t) based on said output signals vg(t) and vvib(t), or processed versions hereof, where the connector device comprises an output connector configured to provide the output signal vo(t) to a corresponding connector on electrical connection means that can electrically connect the connector device to external equipment, such as a power amplifier or a mixer.

Clause 8. A connector device according to any of the preceding clauses, wherein the connector device comprises ratio determining means configured to determine the ratio between two input signals va(t)=vg(t) and vb(t)=k·vg(t), where k·vg(t) is the voltage controlled output signal from pickup means provided in the musical instrument, where the ratio determining means determines the ratio |vb(t)/va(t)|=k, which ratio k, or a quantity related hereto, is provided to a controlled amplifier as a control signal, such that the gain G of the controlled amplifier is equal to k or proportional to k, where the controlled amplifier as an input signal receives the output signal vvib(t) from the vibration transducer and where the controlled amplifier thereby provides an output signal vG(t) given by the expression:

$$vG(t)=L(k \cdot vg(t))vvib(t)=k \cdot L(vg(t))vvib(t)$$

where the connector device further comprises a mixer that is configured to receive said volume-controlled output signal k·vg(t) and said output signal vG(t) from the controlled amplifier as input signals and based hereon provide a connector device output signal vo(t) from the mixer given by the expression:

$$vo(t)=k \cdot [a \cdot vg(t)+(1-a) \cdot L(vg(t)) \cdot vvib(t)]$$

Clause 9. A connector device according to any of the preceding clauses 1 to 7, wherein the connector device comprises a ratio determining means that determines the ratio between two input signals va(t)=vg(t) and vb(t)=k·vg(t), which ratio |vb(t)/va(t)| equals k, and where the ratio k is provided to a controlled amplifier as a control signal, such that the gain G of the controlled amplifier is equal to k, whereby the controlled amplifier provides an output signal vG(t)=k·vvib(t), where the connector device further comprises a mixer that is configured to receive said volume controlled output signal k·vg(t) and said output signal vG(t) from the controlled amplifier as input signals and based hereon provide a connector device output signal vo(t) from the mixer given by the expression:

$$vo(t)=k \cdot [a \cdot vg(t)+(1-a) \cdot vvib(t)]$$

Clause 10. A connector device according to any of the preceding clauses, wherein the input electrical connector means is a jack connector.

Clause 11. A connector device according to any of the preceding clauses, wherein the first aspect, the first, second and third output electrical connector means are jack connectors.

Clause 12. A connector device according to any of the preceding clauses, wherein the second and third output jack connectors are combined to a stereo jack connector.

Clause 13. A connector device according to clause 1, wherein at least two vibration transducers are provided in vibrational contact with the input electrical connector means, and where the connector device comprises one or more electrical output connector means configured to receive the electrical signals generated by the pickup means and the electrical output signals from the at least two vibration transducers, or mixed or processed versions hereof, and to provide these signals, to suitable equipment, such as amplifiers or mixers.

Clause 14. A connector device according to clause 13, wherein said at least two vibration transducers have different frequency responses and/or different directional sensitivities.

Clause 15. A connector device according to clause 13 or 14, wherein said at least two vibration transducers provide electrical output signals to a balancing circuit, where the balancing circuit is configured to provide an output signal Vo(t), which is a weighted combination of the output signal vg(t) from the pickup means and the output signals from the respective vibration transducers.

Clause 16. A connector device according to clause 15, wherein the connector comprises two vibration transducers, and where the output signal Vo(t) is a weighted sum of the output signal vvib1(t) from the first vibration transducer and the output signal vvib2(t) from the second vibration transducer 9" and the output signal vg(t) from the pickup means:

$$Vo(t)=b1vg(t)+b2vvib1(t)+b3vvib2(t)$$

where b1, b2 and b3 are weight factors.

Clause 17. A connector device according to clause 15, wherein the output signal vg(t) from the pickup means is separately provided via suitable connector means to an amplifier or a mixer and wherein either a weighted combination of the at least two output signals vvib1(t) and vvib2(t) or each of these at least two output signals are separately provided to the amplifier(s) or mixer(s) that receives the signal vg(t) from the pickup means.

Clause 18. A connector device according to any of the preceding clause 13 to 17, wherein the respective output signals from the pickup means and the at least two vibrator transducers are amplified and/or impedance matched if required, before these signals are provided to a mixer or amplifier.

Clause 19. A connector device according to any of the preceding clauses, wherein the output electrical connector means are electrical lines, which at one end receives the electrical signals generated by the pickup means and the electrical output signal from the one or more vibration transducers and at the other end are provided with connectors configured to be electrically connected to appropriate input terminals of said mixers and/or amplifiers.

Clause 20. A connector device according to any of the preceding clauses 1 to 15, wherein the output electrical connector means is a wireless communication device that is configured to transmit the output signals from the pickup means and from the one or more vibration transducers, or mixed or processed versions hereof, to one or more receivers that in turn provides these signals to the appropriate input terminals of said mixers and/or amplifiers.

Clause 21. A connector device according to clause 20, wherein said wireless communication device is integrated in the input electrical connector means.

Clause 22. A method for modifying the timbre of the sound emitted from one or more loudspeakers and generated by a musical instrument that comprises one or more strings and pickup means configured to pick up vibrations of the strings and convert these vibrations to first electrical signals, where the method comprises providing one or more vibration transducers in vibration contact with the housing of the musical instrument, such that the vibration transducer generates second electrical signals corresponding to the vibrations of the housing, and mixing said first and second signals, or processed versions hereof, thereby providing a combined output signal based on the signals from said pickup means and said one or more vibration transducer to suitable mixer means or power amplifier means configured to drive said loudspeakers.

Clause 23. A method according to clause 22, wherein at least two vibration transducers are used.

Clause 24. A method according to clause 23, wherein said at least two vibration transducers have different frequency responses and/or different directional sensitivities.

Clause 25. A connector system for electronic instruments, such as an electric guitar, the system comprising:
a connector configured to receive the output signal from a pickup means in the instrument, or a processed/volume adjusted version hereof;

one or more vibration transducers configured to be in vibrational connection with one or more portions of the instrument, which portions vibrate, when the instrument is played upon;

a combination device configured to receive the output signals from said pickup means, or a processed/volume adjusted version hereof, and the output signals, or a processed/volume adjusted version hereof, of said one or more vibration transducers and to provide a blended output signal based on said signals from the pickup means and the vibration transducers, or a processed/volume adjusted version hereof, and provide this blended output signal to subsequent equipment, such as effect pedals, mixers and/or amplifiers.

Clause 26. A connector system according to clause 25, wherein said vibrational connection is established by means of a wire, cord, cable or other suitable electrical line between the connector and the one or more vibration transducers.

Clause 27. A connector system according to clause 25, wherein said vibrational connection is established directly between the respective vibration transducer and the vibrating portion of the instrument.

Although the invention has been explained in relation to the embodiments described above, it is to be understood that many other possible modifications and variations can be made without departing from the scope of the present invention. Thus, for instance, the output signal (or signals) can be provided to an effect pedal operated by the user during a live performance before being provided to a mixer or amplifier.

What is claimed is:

1. A connector device for electronic musical instruments, the connector device comprising:

input electrical connector (1, 2, 3), configured to receive electrical signals generated by pickup provided in or on the instrument, when the instrument is being played by a player;

a vibration transducer (9, 29) configured to be mechanically attached to the input electrical connector (1, 2, 3) or being provided as an integral part of the input electrical connector (1, 2, 3), and to sense the vibrations of the connector (1,2,3) caused by vibrations of the musical instrument such that vibrations from the instrument are transferred to the vibration transducer (9, 29), and the vibration transducer (9, 29) generates an electrical output signal based on the vibrations of the instrument;

one or more electrical output connector (4, 6; 19, 20, 34, 36, 37; 35, 38, 39), configured to receive said electrical signal generated by the pickup and said electrical output signal from the vibration transducer (9, 29), or mixed or processed versions hereof, and to provide these signals, to suitable equipment, such as amplifiers or mixers.

2. A connector device according to claim 1, wherein said mechanical attachment is established via a wire, cord, cable or other suitable electrical line between the connector (1,2, 3) and the vibration transducer (9, 9', 9", 29).

3. A connector device according to claim 1, wherein a signal $v_g(t)$ from the pickup and the signal $v_{vib}(t)$ from the vibration transducer (9, 26) or processed versions of these signals are combined in a mixer (26) or balancing circuit (10) configured to provide an output signal $v_o(t)$ that is a combination of said signals from the pickup and the vibration transducer or processed versions of these signals.

4. A connector device according to claim 3, wherein said mixer (26) comprises two input terminals configured to receive respective input signals $v_1(t)$ and $v_2(t)$ and where the mixer (26) is configured to provide an output signal $v_o(t)$, where said output signal $v_o(t)$ is given by the following expression:

$$v_o(t)=k\cdot[a\cdot v_1(t)+(1-a)\cdot L(v_1(t))\cdot v_2(t)]$$

where $v_1(t)$ is said processed version of the output signal of $v_g(t)$ from the guitar pickup (21) and $v_2(t)$ is said processed version the signal $v_{vib}(t)$ from the vibration sensor (24); k characterizes the setting of a volume control provided in said musical instrument; a is a mixing ratio between zero and unity; and $L(v_1(t))$ is the level of $v_1(t)$.

5. A connector device according to claim 3, wherein said mixer (26) comprises two input terminals configured to receive respective input signals $v_1(t)$ and $v_2(t)$ and where the mixer (26) is configured to provide an output signal $v_o(t)$, where said output signal $v_o(t)$ is given by the following expression:

$$v_o(t)=k\cdot[a\cdot v_1(t)+(1-a)\cdot v_2(t)]$$

where $v_1(t)$ is a function of $v_g(t)$ and $v_2(t)$ is a function of $v_{vib}(t)$; k characterizes the setting of a volume control provided in said musical instrument, and a is a mixing ratio between zero and unity.

6. A connector device according to claim 1, wherein the connector device comprises a male jack connector (1, 2, 3) configured to connect to a corresponding output connector provided in said musical instrument, thus receiving an output signal $v_g(t)$ from pickup provided in the musical instrument, or from a volume control (22) in the musical instrument that provides a volume controlled version of said output signal $v_g(t)$, in or on which male connector (1, 2, 3) there is provided a vibration transducer (9, 29) providing an output signal $v_{vib}(t)$ in response to vibrations of the transducer (9, 29) and means configured to combine said output signals $v_g(t)$ and $v_{vib}(t)$, or processed versions of one or both of these signals and to provide an output signal vo(t) based on said output signals $v_g(t)$ and $v_{vib}(t)$, or processed versions hereof, where the connector device comprises an output connector (4, 6; 34, 36, 37; 35, 38, 39) configured to provide the output signal vo(t) to a corresponding connector on electrical connection that can electrically connect the connector device to external equipment.

7. A connector device according to claim 1, wherein the connector device comprises a controlled output amplifier providing a volume controlled output signal and having a gain G and the connector device comprises a ratio determining means (27) configured to determine the ratio between two input signals $v_a(t)=v_g(t)$ and $v_b(t)=k\cdot v_g(t)$, where $k\cdot v_g(t)$ is the volume controlled output signal from pickup provided in the musical instrument, where the ratio determining means (27) determines the ratio |vb(t)/va(t)|=k, which ratio k, or a quantity related hereto, is provided to a controlled amplifier (28) as a control signal, such that the gain G of the controlled amplifier (28) is equal to k or proportional to k, where the controlled amplifier as an input signal receives the output signal $v_{vib}(t)$ from the vibration transducer (9, 29) and where the controlled amplifier (25) consequently provides an output signal vG(t) given by the expression:

$$vG(t)=L(k\cdot v_g(t))v_{vib}(t)=k\cdot L(v_g(t))v_{vib}(t)$$

where the connector device further comprises a mixer (26) that is configured to receive said volume-controlled output signal $k\cdot v_g(t)$ and said output signal vG(t) from the controlled amplifier (25) as input signals and based hereon provide a connector device output signal $v_o(t)$ from the mixer (26) given by the expression:

$$v_o(t)=k\cdot[a\cdot v_g(t)+(1-a)\cdot L(v_g(t))\cdot v_{vib}(t)].$$

8. A connector device according to claim 1, wherein the connector device comprises a controlled output amplifier providing a volume controlled output signal and having a gain G and the connector device comprises a ratio determining means (27) that determines the ratio between two input signals $v_a(t)=v_g(t)$ and $v_b(t)=k\cdot v_g(t)$, which ratio |vb (t)/va(t)| equals k, and where the ratio k is provided to a controlled amplifier (28) as a control signal, such that the gain G of the controlled amplifier (28) is equal to k, whereby the controlled amplifier (28) provides an output signal $vG(t)=k\cdot v_{vib}(t)$, where the connector device further comprises a mixer (26) that is configured to receive said volume controlled output signal $k\cdot v_g(t)$ and said output signal $vG(t)$ from the controlled amplifier (25) as input signals and based hereon provide a connector device output signal $v_o(t)$ from the mixer (26) given by the expression:

$$v_o(t)=k\cdot[a\cdot v_g(t)+(1-a)\cdot v_{vib}(t)].$$

9. A connector device according to claim 1, wherein the input electrical connector is a jack connector.

10. A connector device according to claim 1, wherein the input electrical connector and the one or more output electrical connector are jack connectors.

11. A connector device according to claim 1, wherein the one or more output connectors are a second and a third output connector which is combined to a stereo jack connector.

12. A connector device according to claim 1, wherein at least two vibration transducers (9', 9") are provided in vibrational contact with the input electrical connector (1, 2, 3), and where the connector device comprises one or more electrical output connector (4, 6; 19, 20, 34, 36, 37; 35, 38, 39), configured to receive the electrical signals generated by the pickup and the electrical output signals from the at least two vibration transducers, or mixed or processed versions hereof, and to provide these signals, to suitable equipment.

13. A connector device according to claim 12, wherein said at least two vibration transducers (9',9") have different frequency responses and/or different directional sensitivities.

14. A connector device according to claim 12, wherein said at least two vibration transducers (9', 9") provide electrical output signals to a balancing circuit (10), where the balancing circuit (10) is configured to provide an output signal Vo(t), which is a weighted combination of the output signal $v_g(t)$ from the pickup means and the output signals from the respective vibration transducers (9', 9").

15. A connector device according to claim 14, wherein the input connector comprises two vibration transducers (9', 9"), and where the output signal Vo(t) is a weighted sum of an output signal $v_{vib1}(t)$ from the first vibration transducer (9') and an output signal $v_{vib2}(t)$ from the second vibration transducer 9" and the output signal $v_g(t)$ from the pickup:

$$Vo(t)=b_1 v_g(t)+b_2 v_{vib1}(t)+b_3 v_{vib2}(t)$$

where b1, b2 and b3 are weight factors.

16. A connector device according to claim 15, wherein the output signal $v_g(t)$ from the pickup is separately provided via suitable connector to an amplifier or a mixer and wherein either a weighted combination of the at least two output signals $v_{vib1}(t)$ and $v_{vib2}(t)$ or each of these at least two output signals are separately provided to the amplifier(s) or mixer(s) that receives the signal $v_g(t)$ from the pickup.

17. A connector device according to claim 12, wherein respective output signals from the pickup and the at least two vibrator transducers are amplified and/or impedance matched if required, before these signals are provided to a mixer or amplifier.

18. A connector device according to claim 1, wherein the output electrical connector are electrical lines, which at one end receives the electrical signals generated by the pickup and the electrical output signal from the vibration transducer and at the other end are provided with connectors configured to be electrically connected to appropriate input terminals of said suitable electrical equipment.

19. A connector device according to claim 1, wherein the output electrical connector is a wireless communication device that is configured to transmit the electrical signals from the pickup and from the vibration transducer, or mixed or processed versions hereof, to one or more receivers that in turn provides these signals to the appropriate input terminals of said mixers and/or amplifiers.

20. A connector device according to claim 19, wherein said wireless communication device is integrated in the input electrical connector.

* * * * *